United States Patent [19]
Almberg et al.

[11] Patent Number: 6,024,116
[45] Date of Patent: Feb. 15, 2000

[54] VALVE ASSEMBLY AND ACUATOR OPERATIVE FOR AUTOMATICALLY SHUTTING OFF WATER AND GAS SUPPLIES TO A HOT WATER HEATER UPON DETECTION OF A WATER LEAK

[75] Inventors: Paul Almberg, Cranston; Clyde Baragwanath, Warwick; Mark Miller, Hope; Steven Fielding, North Kingstown, all of R.I.

[73] Assignee: Aquagard, LLC, Cranston, R.I.

[21] Appl. No.: 09/149,942

[22] Filed: Sep. 9, 1998

[51] Int. Cl.⁷ .......................... F16K 31/02; H01H 29/06; H01H 35/18
[52] U.S. Cl. .......................... 137/312; 122/504; 122/507; 137/68.11; 137/392; 200/61.04; 200/DIG. 41; 307/118; 361/178
[58] Field of Search .................................. 137/67, 68.11, 137/312, 387, 392; 122/504, 504.1, 504.2, 507; 73/304 R; 200/61.04, 61.05, 84 R, DIG. 2, DIG. 40, DIG. 41; 307/118; 340/604, 605, 620, 623, 625; 361/178; 222/54

[56] References Cited

U.S. PATENT DOCUMENTS

| | | | |
|---|---|---|---|
| 2,789,503 | 7/1957 | Carver et al. | 137/67 |
| 3,063,432 | 11/1962 | Bond et al. | 122/504 |
| 3,069,671 | 12/1962 | Taylor | 137/312 |
| 3,473,553 | 10/1969 | Collins | 122/504 |
| 3,520,314 | 7/1970 | Ryen | 137/67 |
| 3,920,031 | 11/1975 | Maxfield et al. | 137/67 |
| 4,437,482 | 3/1984 | Harrison | 137/67 |
| 4,498,604 | 2/1985 | Mackal | 222/5 |
| 4,805,662 | 2/1989 | Moody | 137/312 |
| 5,029,605 | 7/1991 | Dowling et al. | 137/312 |
| 5,188,143 | 2/1993 | Krebs | 137/312 |
| 5,280,802 | 1/1994 | Comuzie, Jr. | 122/504.2 |
| 5,601,124 | 2/1997 | Weinheimer et al. | 222/5 |
| 5,632,302 | 5/1997 | Lenoir, Jr. | 137/312 |
| 5,713,387 | 2/1998 | Armenia et al. | 137/312 |
| 5,785,511 | 7/1998 | Shah | 431/42 |
| 5,857,482 | 1/1999 | Dowling | 122/504.2 |

*Primary Examiner*—George L. Walton
*Attorney, Agent, or Firm*—Barlow, Josephs & Homes, Ltd.

[57] ABSTRACT

A valve assembly is operative for automatically shutting off both a water supply line and gas supply line to a gas-fired hot water vessel upon detection of water discharge, leak or overflow, from the water vessel. The valve assembly is connected in the water supply line and generally includes a valve body, a sliding valve member which is spring biased to a normally closed position, and a water softenable latch which maintains the valve member in an open position against the bias of the spring. The valve assembly is preferably positioned in a drip pan located under the water vessel such that water leaking from the water vessel will accumulate in the drip pan and submerge the valve assembly. Upon exposure to water accumulated in the drip pan, the water softenable latch at least partially softens and releases the valve member to move from its open position to its closed position to cut off water supply through the valve body. In connection with shutting off of the gas supply, a formation on the valve member engages a contact assembly as the valve member moves from the open to closed position. The contact assembly is wired into the power circuit of an electromagnetic valve actuator for a gas supply control valve. Engagement with the contact assembly temporarily disrupts the flow of power to the electromagnetic actuator causing the gas valve to be closed.

14 Claims, 10 Drawing Sheets

VALVE ASSEMBLY AND ACUATOR OPERATIVE FOR AUTOMATICALLY SHUTTING OFF WATER AND GAS SUPPLIES TO A HOT WATER HEATER UPON DETECTION OF A WATER LEAK

BACKGROUND AND SUMMARY OF THE INVENTION

The instant invention relates to actuated valve assemblies which are operative for automatically shutting off the water and gas supplies to a hot water heater upon detection of a water leak from the hot water tank. More particularly, the instant invention relates to a valve assembly and water sensitive actuator therefor which effects shutting off of the water and gas supplies without any external supply of electricity.

Actuators and valves for automatically shutting off the water supply to a hot water tank upon detection of a water leak are well known in the art. In this regard, the U.S. Patents to Carver et al U.S. Pat. No. 2,798,503 and Maxfield U.S. Pat. No. 3,920,031 represent the closest prior art to the subject invention of which the applicant is aware. The U.S. Patent to Carver discloses a leak responsive actuator for cutting off the water supply to a water heater. A spring actuated valve is inserted into the cold water supply line and is connected by a cable to a water softenable latch disposed in a drip tray located beneath the water heater base. The spring actuated valve is normally biased to a closed position by the spring but is maintained in a normally open position by the cable and latch. When the latch is exposed to water, such as when the water heater tank ruptures, the water collected in the drip pan dissolves or softens the latch material thus releasing the cable and allowing the spring actuated valve to close the water supply line. The U.S. Patent to Maxfield discloses a similar device including a check valve and a spring biased actuator. The actuator includes a water dissolvable material which releases a spring biased plunger when exposed to water. The movement of the plunger actuates closing of the check valve. While each of the above-described devices is suitable for automatically shutting off the water to the water heater when a leak is detected, there is an apparent lack of any practical teaching for automatically shutting off the gas supply to the water heater. Although the damage caused by water leaking from the supply line can be substantial, the greater risk factor in terms of human injury can be the natural gas which may subsequently leak from the gas supply line when the pilot light is extinguished from the rising water level, or otherwise. When the pilot light is extinguished, gas may continue to leak from the pilot source, and/or the main burner. In some cases, where the water level rises, the natural gas can bubble up through the water and collect in the interior of the heater unit, which could potentially cause an explosion in the unit. Alternatively, if the tank empties and the pilot is not extinguished, the heat control system will continuously call for heat, and the main burner will run unchecked causing potentially dangerous overheating of the unit. Accordingly, there is believed to be a need for a simple and effective valve assembly for automatically shutting off both the water and gas supplies to a heated water vessel upon the detection of a water leak from the vessel.

In this regard, the present invention provides a valve assembly which is operative for automatically shutting off both a water supply line and gas supply line to a gas-fired hot water vessel upon detection of a water leak from the water vessel. The valve assembly is connected in the cold water supply line and generally includes a valve body, a valve member which is spring biased to a normally closed position, and a water softenable latch which maintains the valve member in an open position against the bias of the spring. The valve assembly is preferably mounted in a drip pan positioned under the water vessel such that water leaking from the water vessel will accumulate in the drip pan and eventually submerge at least a portion of the valve assembly. Upon contact with water accumulated in the drip pan, the water softenable latch will dissolve, or at least partially soften, and release the valve member thereafter moving from its open position to its closed position to cut off water supply through the valve body. In connection with shutting off of the gas supply, a formation on the valve member engages an electrical contact assembly attached to the valve body as the valve member moves from the open to closed position. The contact assembly is wired into the power circuit of an electromagnetic valve actuator of the gas supply control valve that controls gas flow to the water vessel burner. Engagement of the formation with the contact assembly temporarily opens the contact circuit and temporarily disrupts the flow of power to the electromagnetic valve actuator causing the associated solenoid to be released and the gas valve to be closed.

More specifically, the valve assembly includes a valve body having an interior fluid passage, an inlet arm and an outlet arm which are in fluid communication with said fluid passage. The inlet arm is connected to the water supply line and the outlet arm is connected to a water inlet line of the hot water vessel. The valve assembly further includes a valve member slidably received within a separate leg portion depending outwardly from the valve body. A cap is received over the open terminal end of the leg portion, and a tail portion of the valve member extends outwardly through an opening the cap. The valve member is slidably movable within the leg portion of the valve body between an open position wherein a head portion of the valve member is substantially entirely positioned within the leg portion of the valve body allowing water to flow through the fluid passage in the valve body, and a closed position wherein a head portion of the valve member extends into the valve body and matingly engages with a valve seat located within the fluid passage to prevent water from flowing through the valve body. As generally indicated hereinabove, a compression spring is captured between the valve member and the valve body for normally biasing the valve member to the closed position. The water softenable latch is coupled between the valve member and the leg portion of the valve body for normally holding the valve member in the open position against the bias of the spring. The contact assembly comprises a pair of contact members normally biased to a closed circuit condition. In the preferred embodiment, the contact members include leg portions which are snap received into a groove in the exterior tail portion of the valve member. In their normal mounted position, the contact members are in engagement and define a closed circuit. However, when the valve member moves from the open position to the closed position, the legs of the contact elements are forced out of the groove and moved temporarily apart thus opening the circuit, disrupting power to the electromagnetic valve actuator, and closing the gas supply valve.

Accordingly, among the objects of the instant invention are: the provision of a safety device for automatically shutting off the water and gas supply to a hot water heater upon detection of a water leak from the hot water tank; the provision of a valve assembly including a water softenable latch which triggers automatic cut-off of the water and gas supplies without any external supply of electricity; the provision of a valve assembly which generally includes a valve body, a valve member which is spring biased to a normally closed position, and a water softenable latch which maintains the valve member in an open position against the bias of the spring; the provision of such a valve assembly wherein upon contact with water, the water softenable latch will soften and release the valve member to move from its open position to its closed position to cut off water supply through the valve body; the provision of a valve assembly wherein an electrical contact assembly is attached to the valve assembly and is wired into the power circuit of the electromagnetic valve actuator of the gas supply control valve that controls gas flow to the water vessel burner; the provision of such a valve assembly wherein a formation on the valve member engages the electrical contact assembly as the valve member moves from the open to closed position and such engagement temporarily opens the contact circuit and temporarily disrupts the flow of power to the electromagnetic actuator causing the gas valve to be closed.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Referring now to the drawings, the valve assembly of the instant invention is illustrated and generally indicated at 10 in FIGS. 1–7. As will hereinafter be more fully described, the valve assembly is operative for automatically shutting off the water and gas supply lines 12, 14 to a gas-fired hot water vessel 16 upon detection of a leak from the water vessel tank.

Figure 1:
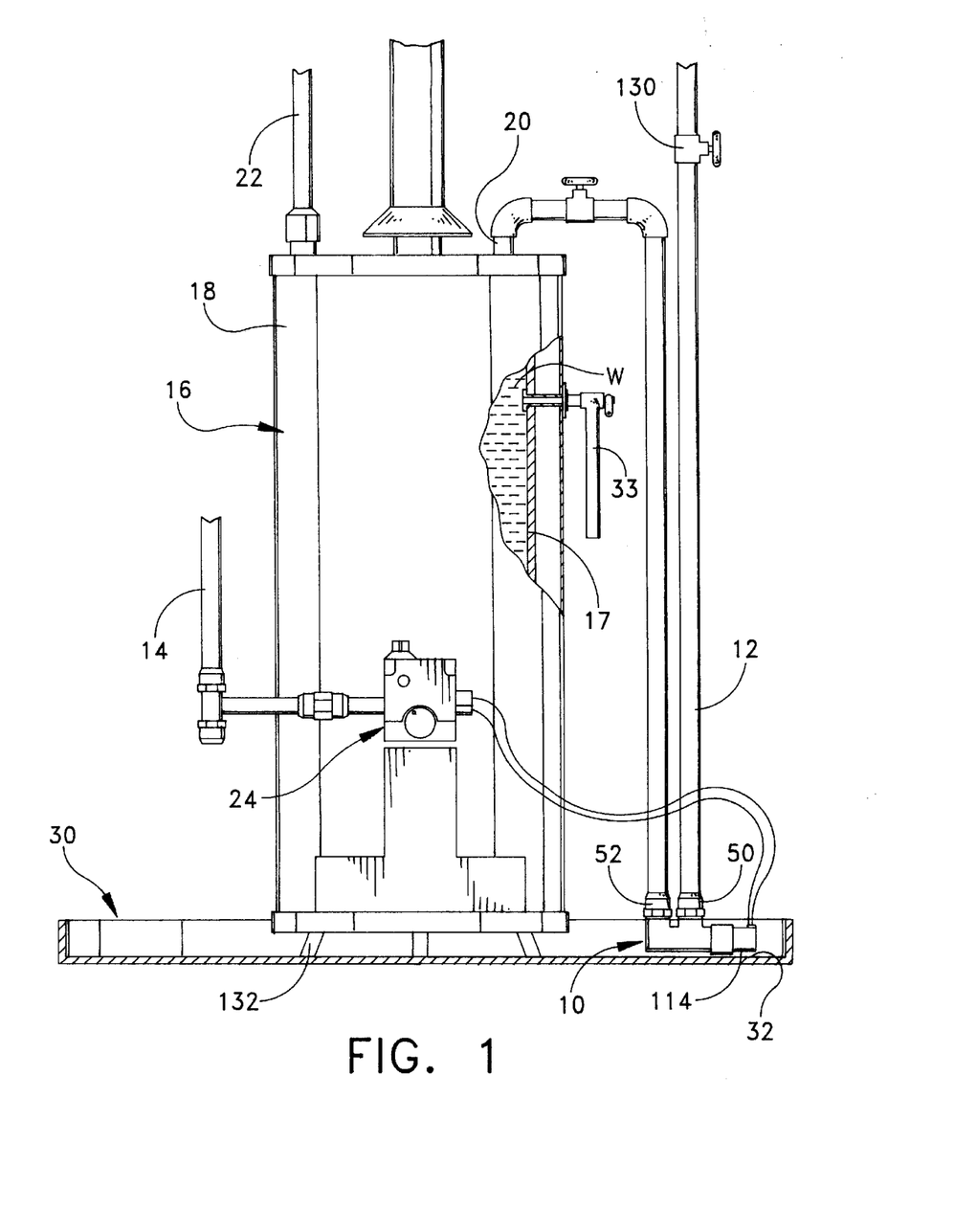
FIG. 1 is a plan view, partially in cross-section, of a water heater equipped with the valve assembly of the present invention.
Figure 2:
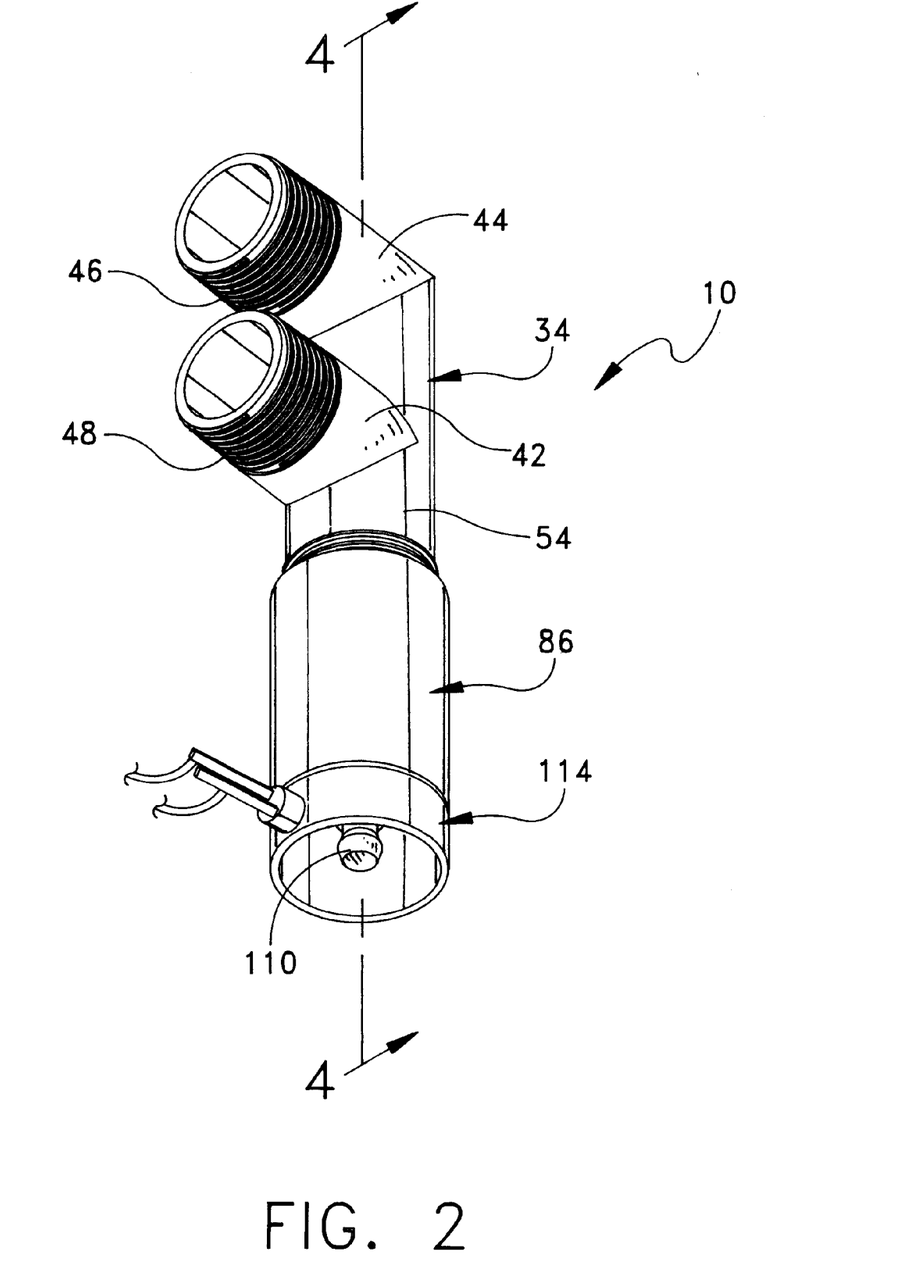
FIG. 2 is a perspective view of the valve assembly of the present invention.
Figure 9:
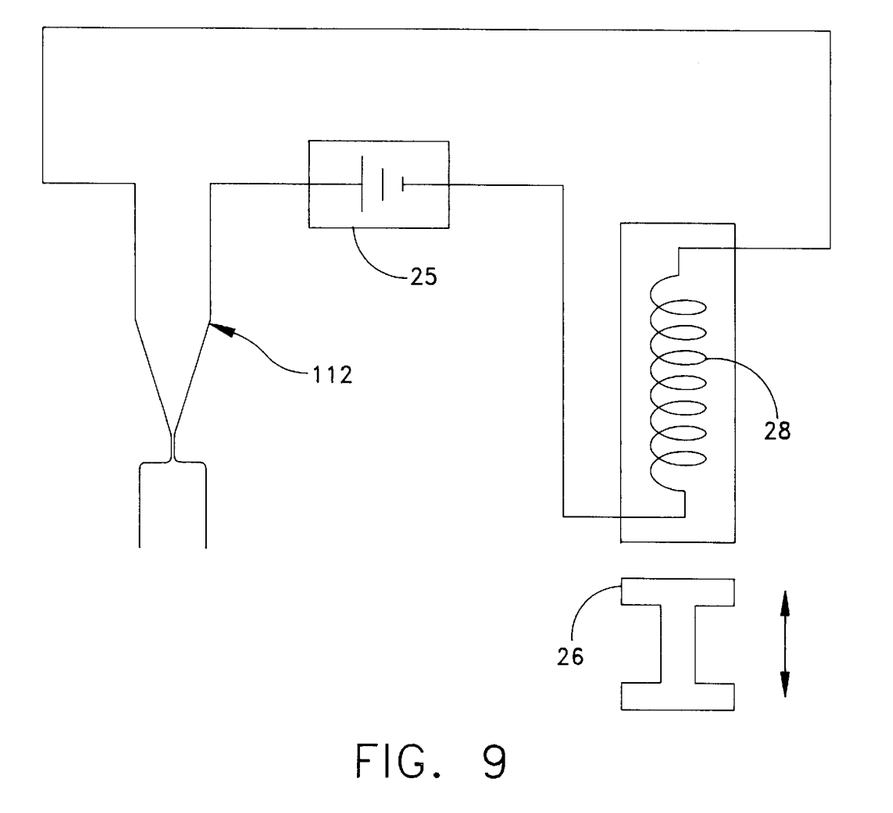
FIG. 9 is a schematic view of the circuit connection between the contact elements and the electromagnetic actuator for the gas line.

Turning first to the hot water vessel 16, the vessel illustrated in FIG. 1 comprises a conventional gas-fired hot water heater as may be found in many homes. The heater 16 includes an interior vessel 17 which holds water W, an exterior housing 18, a cold water inlet 20 for feeding water into the tank, and a hot water outlet 22. The cold water supply line 12 is normally fed directly into the cold water inlet 20. The heater 16 further includes a gas supply control valve 24 which controls the flow of gas from the gas line 14 into the pilot and a main burner (not shown) for heating the water. As well known in the art, the gas supply control valve 24 typically includes a thermocouple 25 (FIG. 9) which generates a current upon being heated. The current is used to operate an electromagnetic solenoid valve generally indicated at 26 (see FIG. 9) to control the flow of gas into the main burner. After the pilot burner (not shown) is ignited, a current is generated by the thermocouple 25 located at the pilot flame. The current flows through windings 28 wrapped around an iron core to form an electromagnet. Energization of windings 28 generates a magnetic force to hold the magnetic solenoid valve 26, positioned in the main gas line, in an open position. If the pilot burner is extinguished, there is no heat generated, the thermocouple 25 does not generate a current, and thus the magnetic solenoid valve closes. It is noted that any disruption of the current in the electromagnet power circuit, even a temporary disruption, will disrupt the magnetic field, and cause the solenoid valve to be released to close the main gas line.

The hot water heater 16 further includes a drip pan 30 located beneath the base of the housing 18. The drip pan 30 is utilized to accumulate water which may leak from the water vessel. In general, the drip pan 30 is utilized to prevent water damage to the floor beneath the water heater, and/or to prevent damage to items which may be stored on the floor next to the water heater.

Turning back to the invention, the valve assembly 10 is connected to the cold water supply line 12 and is preferably physically mounted adjacent a bottom wall 32 of the drip pan 30 such that water leaking from the water vessel will accumulate in the drip pan and eventually submerge at least a portion of the valve assembly. Alternatively, water can collect in the pan 30 from the discharge of water or steam from a steam pressure valve 33 which extends down the side of the housing. In situations where the heating control of the unit malfunctions and the main burner is continuously running (run-away), the water in the tank will eventually boil creating steam pressure in the tank. The steam pressure valve relieves this pressure from the system to prevent explosion. Water and steam discharged from the steam pressure valve would collect in the pan or spray onto the valve 10, triggering the valve and shutting off both the water and gas supplies. The valve 10 is therefore also useful in preventing overheating of a tank with a run-away burner.

Figure 4:
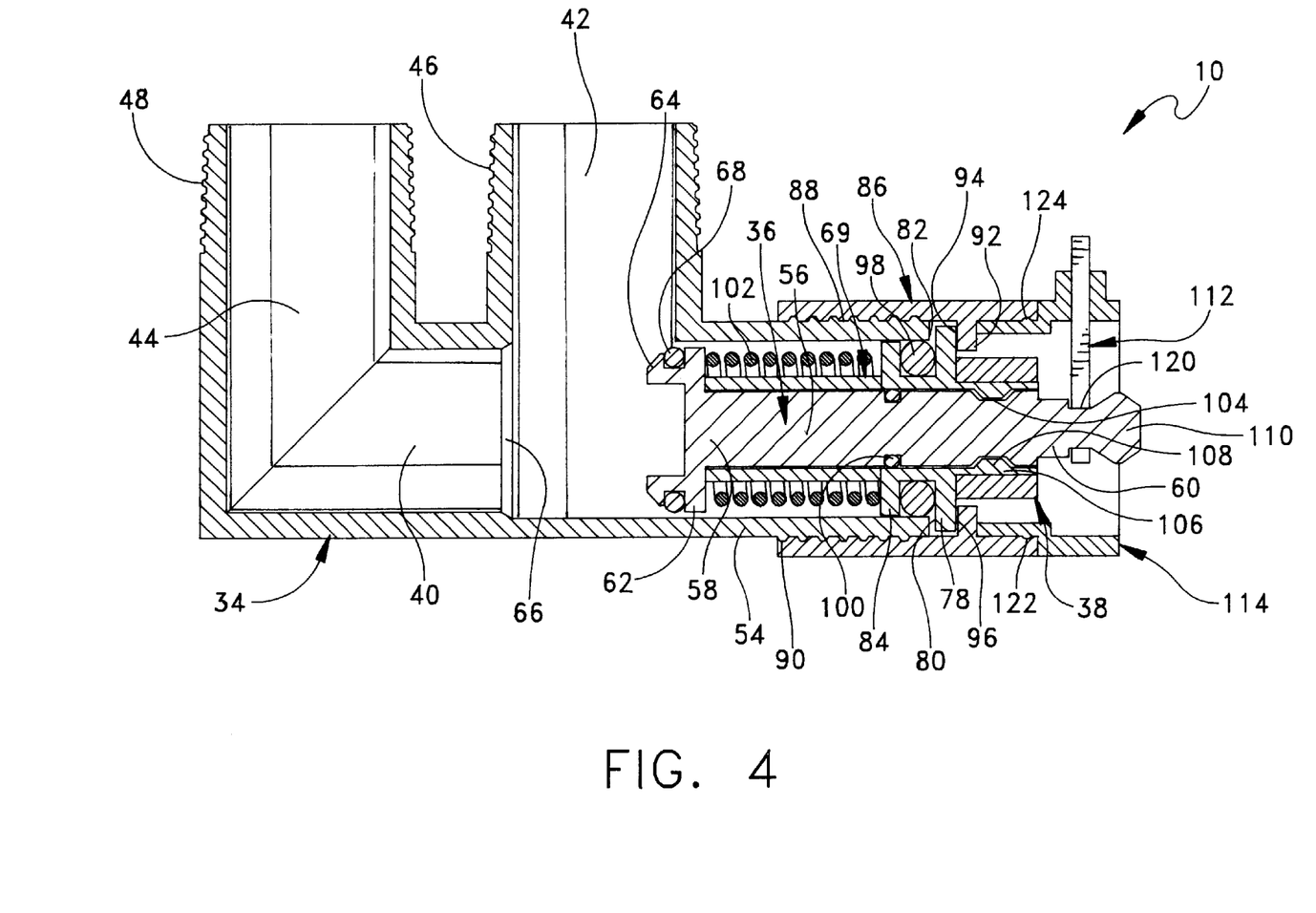
FIG. 4 is a cross-sectional view thereof taken along line 4—4 of FIG. 2.

Turing now to FIG. 4, the valve assembly 10 broadly comprises a valve body generally indicated at 34, a movable valve member generally indicated at 36, and a water softenable latch generally indicated at 38. Unless otherwise specifically indicated herein, it is to be understood that the component parts of the valve assembly 10 are preferably formed from a suitable plastic material. The valve body 34 has an interior fluid passage 40, an inlet arm 42 and an outlet arm 44 which are in fluid communication with said fluid passage 40. The inlet arm 42 is connected to the cold water supply line 12 and the outlet arm 44 is connected to the water inlet line 20 of the hot water vessel 16. In this regard, both the inlet arm 42 and the outlet arm 44 include outwardly threaded surfaces 46, 48 respectively, for making connections to threaded fittings 50, 52 (FIG. 1) on the plumbing lines.

The valve member 36 is slidably received within a separate leg portion 54 of the valve body. Leg portion 54 depends outwardly from the inlet arm side 42 of the valve body 34 so that the valve member 36 is axially aligned with the fluid passage 40. The valve member 36 comprises an elongate cylindrical body 56 having a head end 58 and a tail end 60. The head end 58 includes a flange 62 having a chamfered valve head 64 formed thereon. The valve head 64 is sized and configured for mating engagement with a chamfered valve seat 66 formed in the fluid passage 40 within the valve body 34. An O-ring 68 is captured between the flange 62 and the valve head 64 for engaging the valve seat 66 to form a water tight seal. Although the leg portion 54 is specifically illustrated as depending from the outlet arm 44, the arrangement of the leg portion 54 and valve member 36 can be rearranged to depend from virtually any position on the valve body 34 as long as the valve seat 66 is properly positioned to matingly engage with the head portion 64 of the valve member 36.

To provide axial alignment of the valve member 36 within the leg portion 54 of the valve body 34, the valve member 36 is slidably received within a reduced diameter sleeve generally indicated at 69. The sleeve 69 is captured co-axially within the leg portion 54 of the valve body 34 with the outer cylindrical surface 70 of the valve member 36 received in a closely fitting sliding relationship with the inner surface 72 of the sleeve 69 (see FIG. 9). The sleeve 69 has a first end 74 which extends into the interior of the valve body 34 and a second end 76 which extends outwardly. The central portion of the sleeve 69 includes an outwardly extending flange 78 having an inner surface 80 which engages with the terminal end wall 82 of the leg portion 54, and the sleeve 69 further includes a second smaller diameter flange 84 spaced inwardly from the first flange 78.

The sleeve 69 is mounted onto the valve body 34 by an annular cap generally indicated at 86 received over the open terminal end of the leg portion 54. Inward threads 88 on the cap 86 engage with outward threads 90 on the exterior surface of the leg portion 54 to create tight fit of the cap 86 and leg portion 54. The cap 86 includes an inwardly extending annular flange 92 having an inner surface 94 which engages the outer surface 96 of the sleeve flange 78 and forces the inner surface 80 of the sleeve flange 78 into tight engagement with the terminal end wall 82 of the leg portion 54. To insure a water tight seal between the sleeve 69 and the interior wall of the valve body 34, an O-ring 98 is mounted within the channel formed by the two flanges. To form a water tight seal between the interior surface 72 of the sleeve 69 and the exterior surface 70 of the valve member another O-ring 100 is mounted in a circumferential groove in the outer surface 70 of the valve member 36. The opening in the center of the annular flange 92 allows the second end 76 of the sleeve 69 and the tail portion 60 of the valve member 36 to extend outwardly through the center of the cap 86.

Figure 3:
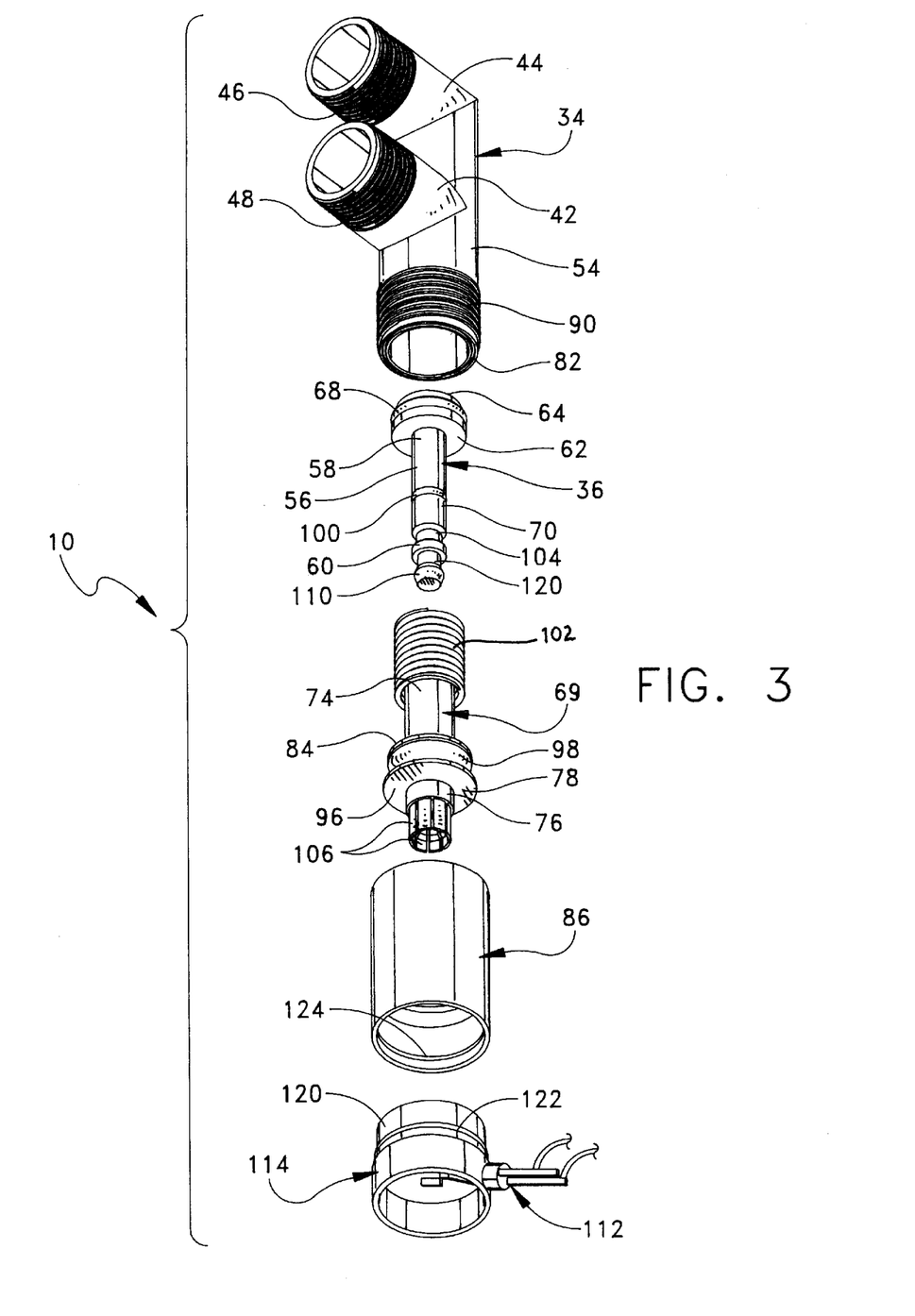
FIG. 3 is an exploded perspective view thereof.
Figure 6:
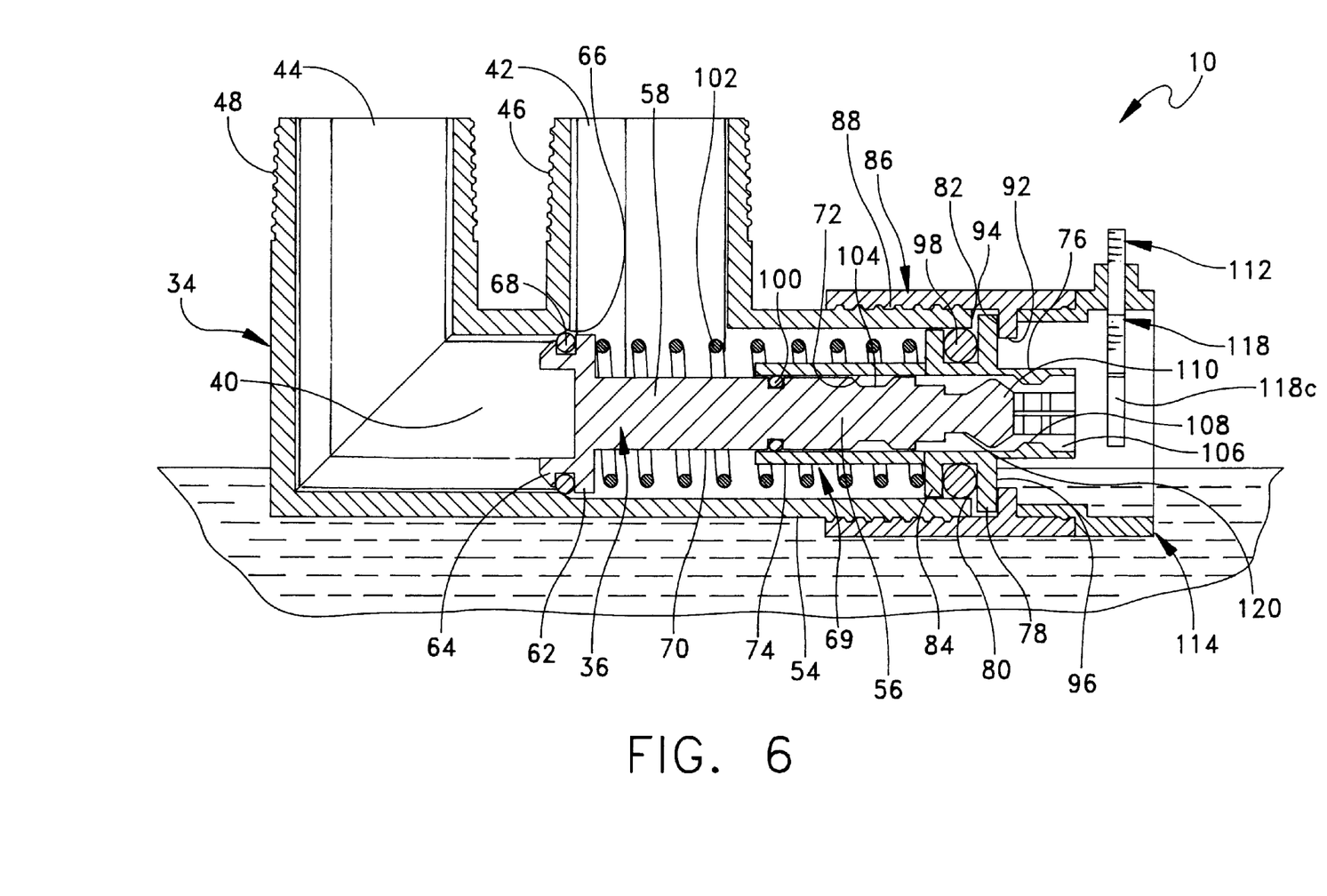
FIG. 6 is another cross-sectional view of the assembly showing the valve member in a released position to close the water flow through the device.
Figure 7:
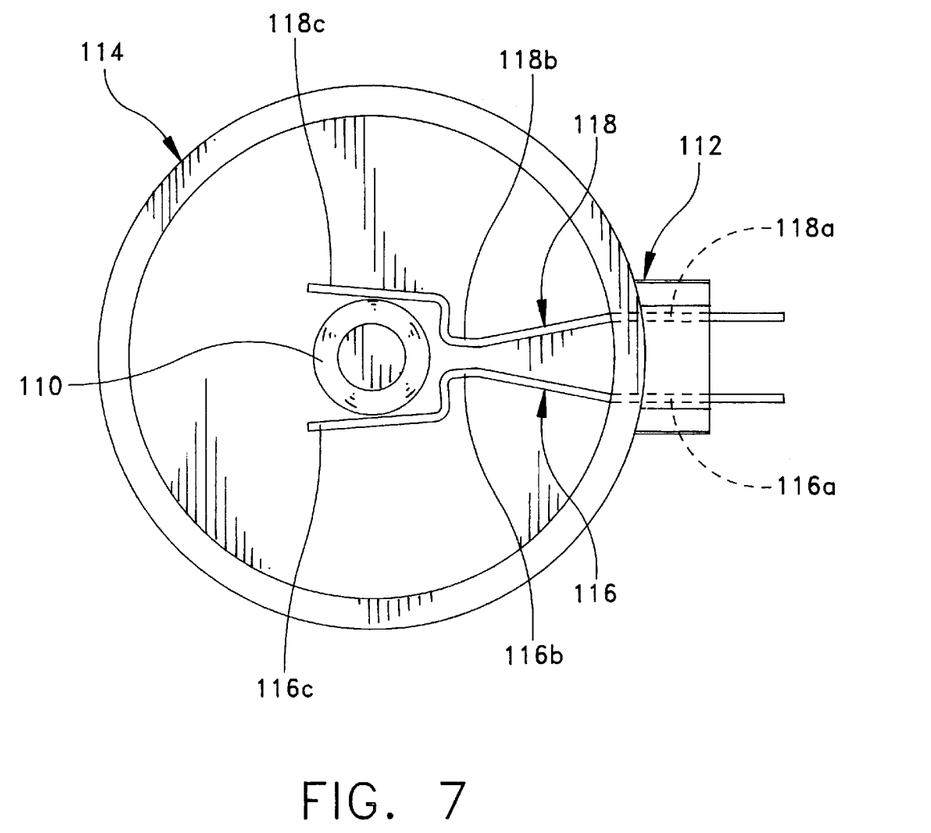
FIG. 7 is another end view of the assembly showing the contact elements in a separated condition.

The valve member 36 is slidably movable within the leg portion 54 of the valve body 34 between an open position (FIG. 4) wherein the head portion 58 of the valve member 36 is substantially entirely positioned within the leg portion 54 of the valve body 34 allowing water to flow through the fluid passage 40 in the valve body 34, and a closed position (FIG. 6) wherein the head portion 58 of the valve member 36 extends into the valve body 34 and matingly engages with the valve seat 66 located within the fluid passage 40 to prevent water from flowing through the valve body 34. The valve member 36 is normally biased to the closed position (FIG. 6) by a compression spring 102 which is captured between the inner flange 84 on the sleeve 69 and the flange 62 at the head end 58 of the valve member 36. However, the valve member 36 is normally maintained in the open position (FIG. 4) against the bias of the spring 102 by the water softenable latch 38 which is coupled between the valve member 36 and the valve body 34 when the valve member 36 is in the open position (FIG. 4). The latch 38 comprises a water softenable or water soluble material which surrounds interengaging formations (to be described hereinafter) formed on the valve member 36 and the sleeve 69. Water softenable and water soluble materials and latches of the type contemplated herein are fully described in U.S. Pat. No. 4,498,604 (Auto-Inflator for a Life Jacket) and U.S. Pat. No. 3,920,031 (Safety Shut Off). For purposes of the present disclosure, the term water softenable is used interchangeably with water soluble, and is intended to encompass all materials which partially or completely dissolve in water or which are structurally weakened, i.e. softened, when exposed to water or moisture. When the water softenable material is dry it rigidly maintains the interengaging formations together against the bias of the compression spring 102 which would normally force the valve member 36 to the closed position (FIG. 6). Referring to FIGS. 3, 4 and 6, the interengaging formations comprise a circumferential groove 104 adjacent the tail end 60 of the valve member 36, and a plurality of circumferentially spaced longitudinally extending, resilient fingers 106 on the outer end 76 of the sleeve 69. Each finger 106 having an inwardly extending detent 108. The groove 104 and detents 108 are longitudinally aligned so that the detents 108 are positioned within the groove 104 when the valve member 36 is in the closed position (FIG. 4). The latch 38 comprises a paper ring which surrounds the fingers 106 at the location of the detents 108 and groove 104. When the latch 38 is in place, the latch 38 prevents the resilient fingers 106 from deflecting outwardly and releasing the valve member 36. However, with the latch 38 removed, the compression force of the spring 102 is more than sufficient to force the valve member 36 forwardly, thereby forcing resilient fingers 106 apart. It can therefore be seen that the latch normally holds the valve member in the closed position against the bias of the spring. Upon contact with water accumulated in the drip pan, or by water sprayed from the steam pressure valve, the water softenable latch 38 will soften to a point where its tensile strength is weakened, thereby releasing the interengaging formations 104, 108 and allowing the valve member 36 to move to the closed position (FIG. 6). In other words, the latch 38 weakens to a point where the force of the spring 102 will cause the valve to rip the paper ring 38.

In connection with triggering the electromagnetic solenoid valve 26 to shut off the main gas supply 14, an external formation 110 on the valve member 36 interacts with an electrical contact assembly, generally indicated at 112, as the valve member moves from the open to closed position. The contact assembly 112 is wired into the power circuit of the electromagnetic solenoid valve 26 (see FIG. 9). Engagement of the formation 110 with the contact assembly 112 temporarily opens the power circuit and temporarily disrupts the flow of power to the electromagnet windings 28 causing the associated solenoid 26 to be released and the gas valve to be closed.

Figure 5:
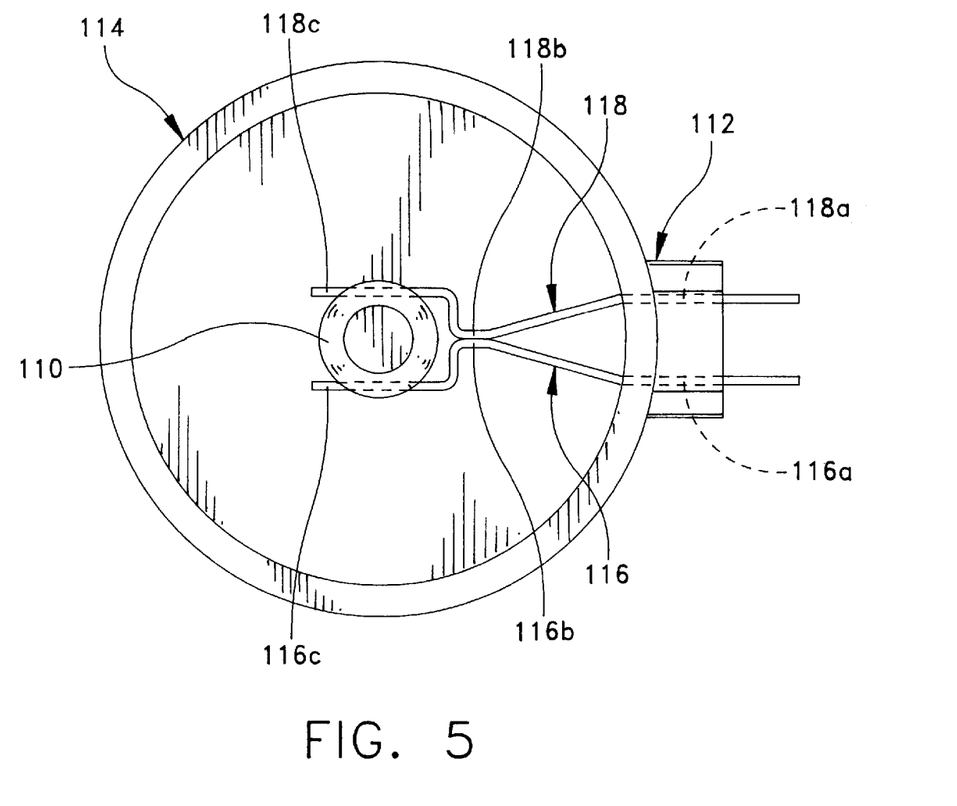
FIG. 5 is an end view of the device showing the arrangement of the contact elements.

The contact assembly 112 comprises a retaining ring 114 which is attached to the cap 86 of the valve assembly 10, and a pair of spring contact members 116, 118 normally biased to a closed circuit condition (FIG. 5). A reduced diameter shoulder portion 120 of the retaining ring 114 is slidably received into the open end of the cap 68 wherein a cooperating ridge 122 and groove 124 provide a snap-fit. The contact members 116, 118 include a body portion (a) which extends through the retaining ring 114. In their normal mounted position, contact portions (b) of the contact members 116, 118 are in engagement to define a closed circuit (FIG. 5). Each of the contact members 116, 118 further includes a leg portion (c) depending outwardly from the contact portion (b) which is utilized to separate the contact elements 116, 118 as described below. When the retaining ring 114 is mounted onto the cap 86, the leg portions 116c, 118c are received into a groove 120 formed on the tail end of the valve member 36. The groove 120 is sized so that the legs 116c, 118c are maintained in their normal spacing and the contact portions 116b, 118b are in engagement (FIG. 5). However, when the valve member moves from the open position (FIG. 4) to the closed position (FIG. 6), the legs 116c, 118c of the contact elements 116, 118 are forced apart by the bulb formation 110 formed at the end of the valve member 36 thus opening the circuit (FIG. 7), disrupting power to the electromagnetic valve actuator 26, and closing the gas supply valve.

Figure 8:
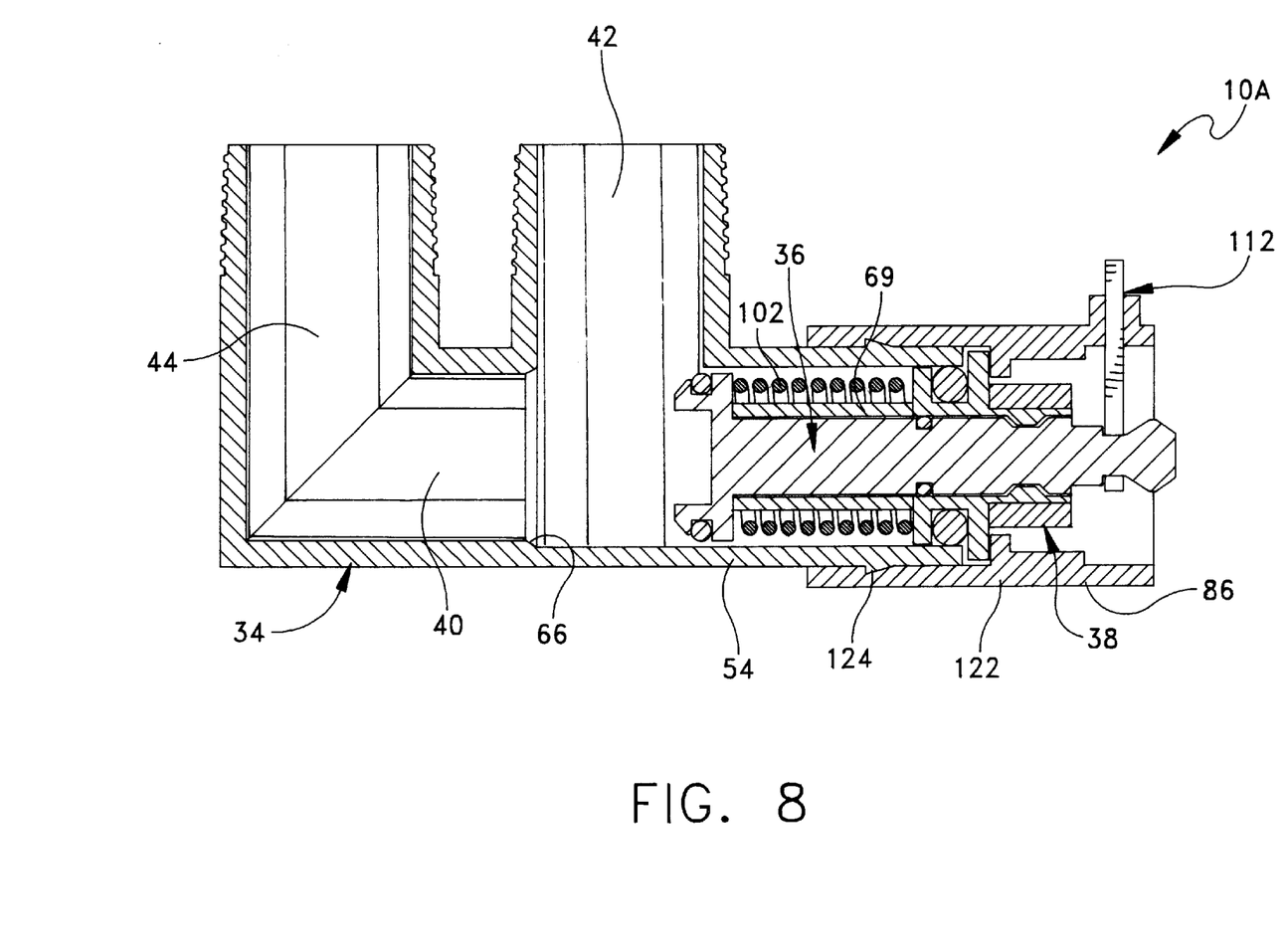
FIG. 8 is a cross-sectional view of an alternate embodiment of the valve assembly showing a snap-on cap member.

Referring now to FIG. 8, there is shown a second embodiment of the valve assembly generally indicated at 10A. The second embodiment 10A is virtually identical to the first embodiment 10 with the exception that the cap 86 and retaining ring 114 have been formed as a single unit 122, and the cap 122 mounted to the valve body 34 by means of a one-way interfitting snap formations 124. In the first embodiment, the threaded cap 86 allowed for replacement of the water softenable latch 38, while this second embodiment 10A would have only a single use.

Figure 10:
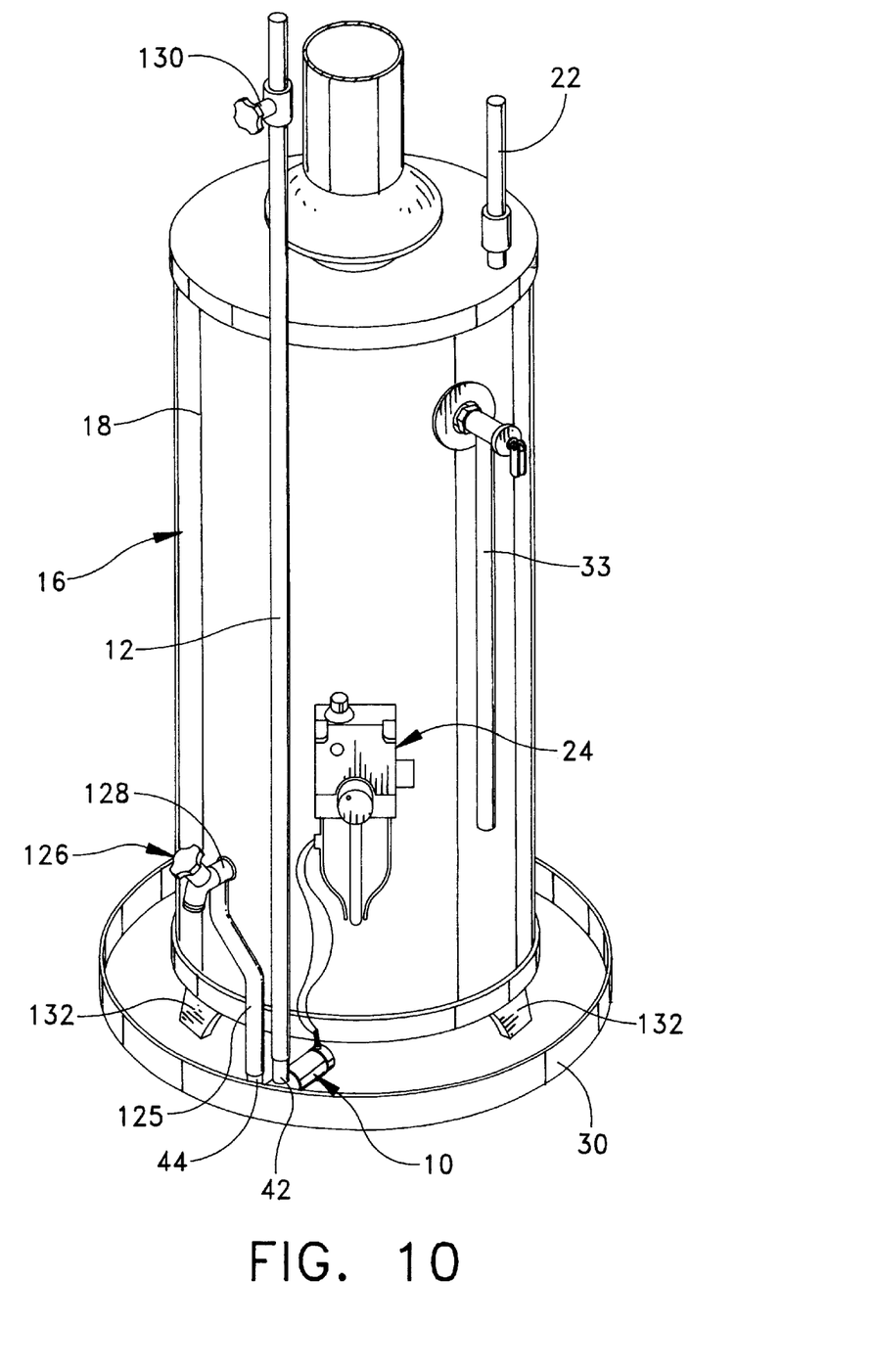
FIG. 10 is a perspective view of an alternative arrangement for connecting the outlet of the valve assembly to a drain valve of the water heat unit.

Referring to FIG. 10, an alternative water inlet and outlet connection arrangement is illustrated. The basic arrangement of the water heater unit 16 and housing 18 is the same as previously described, except for the water inlet line 20. The heater 16 includes an interior vessel which holds water (not shown), an exterior housing 18, and a hot water outlet 22. The cold water supply line 12 feeds into the inlet arm 42 of the valve, and rather than having the outlet arm 44 feed directly into the cold water inlet 20, the outlet arm 44 is fed by a pipe 125 to a drain valve 126 which is in turn connected to the interior vessel (not shown). The drain valve 126 is a standard feature on virtually every commercially available hot water vessel. The drain valve 126 is fitted with a T fitting 128 to allow the pipe 125 to feed into the interior water vessel. Water from the cold water supply line 12 thus enters the water vessel through the bottom of the vessel rather than through the top, and the vessel could be drained using the drain in the same manner by closing a valve 130 in the cold water supply line 12 and opening the valve 126. The intention of this arrangement is to provide a simple way for an OEM to incorporate the present valve 10 as a standard feature into an existing water heater design without substantial modification of the water heater design. The addition of the T fitting 128 on the drain valve 126 is a simple modification which could be easily accepted by the industry.

The illustrated embodiment in FIG. 10 also includes a drip pan 30 as previously described, and the valve 10 sits in the bottom of the drip pan. While this appears to be the most advantageous means of collecting water beneath the water heater, other configurations of pans and valve supports are contemplated. For example, the pan 30 could be tack welded to the interior portions of legs 132 which hold the housing 18 above the ground. In this arrangement, the valve 10 would need to be located in the pan which is now completely underneath the housing 18, and would require additional elbow fittings to permit the inlet and outlet water fittings to be routed under the housing 18. It is also contemplated that the valve 10 could be mounted directly to one of the legs 132 of the heater in a position close to the ground. Event further still, in water heaters which utilize a ring stand (not shown) to support the housing 18 above the ground, the ring stand could be provided with a bottom plate to collect water under the housing 18. The valve 10 could then be mounted in the ring stand so that it is exposed to water collected in the "pan" formed by the ring stand and plate.

It can therefore be seen that the present invention provides a valve assembly 10 which safely and effectively shuts off both the water and gas supplies to a gas-fired hot water vessel in the event of a leak. The use of a spring 102 and water softenable latch 38 effectively provides an actuator which does not require any outside power source to provide movement of the valve member. The unique contact assembly as provided with the valve further provides a safe and effective mechanism for shutting off the gas supply to the burner in the event of a leak. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A valve assembly for automatically shutting off a water supply line and disrupting an electrical circuit of a hot water vessel, said hot water vessel including a water inlet line, and an electrical circuit, said valve assembly comprising:

a valve body having an inlet opening and an outlet opening which are in fluid communication, said inlet opening being connected to said water supply line and said outlet opening being connected to the water inlet line of said hot water vessel;

a valve member movable within the valve body between an open position wherein the valve member does not block fluid flow between the inlet opening and the outlet opening, and a closed position wherein the valve member blocks fluid flow between the inlet opening and the outlet opening;

a pair of contacts mounted adjacent to said valve member and being normally biased to a closed circuit condition, said pair of contacts being in electrical communication with said electrical circuit of said hot water vessel; and a water softenable actuator engaged with a portion of the valve member within said valve body, said water softenable actuator being in operative association with said valve member such that upon being subjected to water said water softenable actuator is weakened in said subjected water thus causing said valve member to move from said open position to said closed position, said valve member including a portion that engages said pair of contacts along a portion of the travel of said valve member as said valve member is moved from said open position to said closed position, said valve member portion moving said pair of contacts apart to at least temporally form an open circuit condition and at least temporarily disrupt power to said electrical circuit at an intermediate point of travel between said open and closed positions.

2. A valve assembly for automatically shutting off a water supply line and gas supply line to a gas-fired hot water vessel, said hot water vessel including a water inlet line, and a gas supply control valve mounted in said gas supply line, said gas supply control valve having an electromagnetic valve actuator, said valve assembly comprising:

a valve body having an interior fluid passage, inlet opening and an outlet opening which are in fluid communication with said fluid passage, said inlet opening being connected to said water supply line and said outlet opening being connected to the water inlet line of said hot water vessel;

a valve member movable within the valve body between an open position wherein the valve member does not block fluid flow through said fluid passage, and a closed position wherein the valve member blocks fluid flow through said fluid passage;

a spring for normally biasing said valve member to said closed position;

a water softenable latch engaged between the valve member and the valve body for normally holding said valve member in said open position against the bias of said spring;

a pair of contact elements attached to said valve body adjacent to said valve member, said contact normally being biased to a closed circuit condition, said pair of contact elements being in electrical communication with a power circuit of said electromagnetic valve actuator, said contact elements being selectively movable to an open circuit condition whereby electrical power to said electromagnetic valve actuator is temporarily disrupted and said gas supply control valve is closed, said water softenable latch softening upon exposure to water wherein said valve member is released and automatically moved from said open position to said closed position by said spring, said valve member including a formation which engages said pair of contact elements along a portion of the travel of said valve member, said formation moving said pair of contact elements apart to at least temporarily form an open circuit condition at an intermediate point of travel between said open and close positions, whereby said water supply and said gas supply to said water vessel are simultaneously shut off.

3. The valve assembly of claim 2 wherein said valve member is slidably movable within said valve body.

4. The valve assembly of claim 3 wherein said valve body includes a valve seat located within said fluid passage between said inlet and outlet openings, said valve member having a head portion which matingly engages said valve seat when said valve member is normally biased to said closed position.

5. A valve assembly for automatically shutting off a fluid supply line comprising:

a valve body having an interior fluid passage, an inlet arm portion and an outlet arm portion which are in fluid communication with said fluid passage, said inlet arm portion and said outlet arm portion being connected to said fluid supply line, said valve body including a valve seat located within said fluid passage, said valve body further including a leg portion depending outwardly therefrom, said leg portion having an open terminal end, said leg portion being in fluid communication with said fluid passage;

a sleeve member mounted within the leg portion of the valve body;

a valve member having a head portion and a tail portion, said valve member being slidably captured within said sleeve member, said valve member being slidably movable within the leg portion of the valve body between an open position wherein the valve member is substantially entirely positioned within the leg portion of the valve body allowing fluid to flow through said fluid passage, and a closed position wherein the head portion of the valve member extends into the fluid passage and matingly engages with said valve seat to prevent fluid from flowing through the fluid passage, said sleeve member including a flexible formation that engages with a complementary formation provided on said tail portion of said valve member when said valve member is in said open position;

a spring captured between the valve member and the sleeve member for normally biasing said valve member to said closed position; and a fluid softenable latch surrounding said formations on said sleeve member and said valve member and maintaining said formations in mating engagement for normally holding said valve member in said open position against the bias of said spring, said latch at least partially softening upon exposure to fluid wherein said formations are released from engagement and said valve member is automatically moved from said open position to said closed position by said spring, whereby fluid flow through said valve assembly is shut off.

6. The valve assembly of claim 5 wherein said valve member is slidably received into a sleeve disposed within the leg portion of the valve body, said valve member having a circumferential groove therein, said sleeve having a plurality of circumferentially spaced longitudinally extending retaining fingers, each of said fingers having an inwardly extending detent which is aligned with said circumferential groove in said valve member when said valve member is in said open position, said latch comprising a water softenable ring received around said retaining fingers to normally maintain said detents in engagement with said circumferential groove and thus maintain said valve member in said open position.

7. A valve assembly for automatically shutting off a water supply line and gas supply line to a gas-fired hot water vessel, said hot water vessel including a water inlet line, and a gas supply control valve mounted in said gas supply line, said gas supply control valve having an electromagnetic valve actuator, said valve assembly comprising:

a valve body having an interior fluid passage, in inlet arm portion and an outlet arm portion which are in fluid communication with said fluid passage, said inlet arm portion being connected to said water supply line and said outlet arm portion being connected to the water inlet line of said hot water vessel said valve body including a valve seat located within said fluid passage, said valve body further including a leg portion depending outwardly therefrom, said leg portion having an open terminal end, said leg portion being in fluid communication with said fluid passage;

a sleeve member mounted within the leg portion of the valve body;

valve member having a head portion and a tail portion, said valve member being slidably captured within said sleeve member, said valve member being slidably movable within the leg portion of the valve body between an open position wherein the valve member is substantially entirely positioned within the leg portion of the valve body allowing water to flow through said fluid passage, and a closed position wherein the head portion of the valve member extends into the fluid passage and matingly engages with said valve seat to prevent water from flowing through the fluid passage;

a spring captured between the valve member and the sleeve member for normally biasing said valve member to said closed position;

a water softenable latch engaged between the valve member and the sleeve member for normally holding said valve member in said open position against the bias of said spring; and a pair of contact elements attached to said valve body adjacent to said valve member, said contact normally being biased to a closed circuit condition, said pair of contact elements being in electrical communication with a power circuit for said electromagnetic valve actuator, said pair of contact elements being selectively movable apart to an open circuit condition whereby electrical power to said electromagnetic valve actuator is at least temporarily disrupted and further whereby said gas supply control valve is closed, said latch softening upon exposure to water wherein said valve member is automatically moved from said open position to said closed position by said spring, said valve member including a portion which engages aid pair of contact elements along a portion of the travel of said valve member, said valve member portion moving said pair of contact elements apart to at least temporarily form said open circuit condition at an intermediate point of travel between said open and closed positions, whereby said water supply and said gas supply to said water vessel are simultaneously shut off.

8. The valve assembly of claim 7 wherein said valve member is slidably received into a sleeve disposed within the leg portion of the valve body, said valve member having a circumferential groove therein, said sleeve having a plurality of circumferentially spaced longitudinally extending retaining fingers, each of said fingers having an inwardly extending detent which is aligned with said circumferential groove in said valve member when said valve member is in said open position, said latch comprising a water softenable ring received around said retaining fingers to normally maintain said detents in engagement with said circumferential groove and thus maintain said valve member in said open position.

9. The valve assembly of claim 8 wherein at least one of said contact elements includes an outwardly extending leg portion which engages with a mating formation on said valve member whereby movement of said valve member causes said leg portion to move said contact element and at least temporarily create an open circuit condition.

10. A valve assembly for automatically shutting off a water supply line and gas supply line to a gas-fired hot water vessel, said hot water vessel including a water inlet line, and a gas supply control valve mounted in said gas supply line, said gas supply control valve having an electromagnetic valve actuator, said valve assembly comprising:

a valve body having an interior fluid passage, an inlet arm portion and an outlet arm portion which are in fluid communication with said fluid passage, said inlet arm portion being connected to said water supply line and said outlet arm portion being connected to the water inlet line of said hot water vessel, said valve body including a valve seat located within said fluid passage, said valve body further including a leg portion depending outwardly therefrom, said leg portion having an open terminal end, said leg portion being in fluid communication with said fluid passage;

a sleeve member mounted within the leg portion of the valve body;

a valve member having a head portion and a tail portion, said valve member being slidably captured within said sleeve member, said valve member being slidably movable within the leg body portion of the valve body between an open position wherein the valve member is substantially entirely positioned within the leg portion of the valve body allowing water to flow through said fluid passage and a closet position wherein the head portion of the valve member extends into the fluid passage and matingly engages with said valve seat to prevent water from flowing through the fluid passage;

a spring captured between the valve member and the sleeve member for normally biasing said valve member to said closed position;

a water softenable latch engaged between the valve member and the sleeve member for normally holding said valve member in said open position against the bias of said spring; and a pair of contacts in electrical communication with a power circuit for said electromagnetic valve actuator, said pair of contacts being selectively movable apart to an open circuit condition whereby electrical power to said electromagnetic valve actor is at least temporarily disrupted and further whereby said gas supply control valve is closed, said latch softening upon exposure to water wherein said valve member is released and automatically moved from said open position to said closed position by said spring, said valve member including a portion which engages said pair of contact elements along a portion of the travel of said valve member, said valve member portion at least temporarily moving said pair of contacts apart to said open circuit condition at an intermediate point of travel between said open and closed positions, whereby said water supply and said gas supply to said water vessel are simultaneously shut off.

11. The valve assembly of claim 10 wherein said valve member is slidably received into a sleeve disposed within the leg portion of the valve body, said valve member having a circumferential groove therein, said sleeve having a plurality of circumferentially spaced longitudinally extending retaining fingers, each of said fingers having an inwardly extending detent which is aligned with said circumferential groove in said valve member when said valve member is in said open position, said latch comprising a water softenable ring received around said retaining fingers to normally maintain said detents in engagement with said circumferential groove and thus maintain said valve member in said open position.

12. The valve assembly of claim 10 wherein said pair of contacts and said valve member include interengaging elements whereby movement of said valve member causes a corresponding movement of said pair of contacts to create said open circuit condition.

13. A valve assembly for automatically shutting off a water supply line to a hot water vessel, said hot water vessel including a water inlet line, said valve assembly comprising:

a valve body having an interior fluid passage, an inlet arm portion and an outlet arm portion which are in fluid communication with said fluid passage, said inlet arm portion being connected to said water supply line and said outlet arm portion being connected to the water inlet line of said hot water vessel, said valve body including a valve seat located within said fluid passage, said valve body further including a leg portion depending outwardly therefrom, said leg portion having an open terminal end, said leg portion and being in fluid communication with said fluid passage;

a sleeve member mounted within the leg portion of the valve body;

valve member having a head portion and a tail portion, said valve member being slidably captured within the sleeve member, said valve member being slidably movable within the leg body portion of the valve body between an open position wherein the valve member is substantially entirely positioned within the leg portion of the valve body allowing water to flow through said fluid passage, and a closed position wherein the head portion of the valve member extends into the fluid passage and matingly engages with said valve seat to prevent water from flowing through the fluid passage;

said sleeve member including a flexible formation that engages with a complementary formation provided on said tail portion of said valve member when said valve member is in said open position;

a spring captured between the valve member and the sleeve member for normally biasing said valve member to said closed position; and a water softenable latch surrounding said formations on said sleeve member and said valve member and maintaining said formations in mating engagement for normally holding said valve member in said open position against the bias of said spring, said latch at least partially softening upon exposure to water wherein said formations are released from engagement and said valve member is released and automatically moved from said open position to said closed position by said spring whereby said water supply to said water vessel is shut off.

14. The valve assembly of claim 13 wherein said valve member is slidably received into a sleeve disposed within the leg portion of the valve body, said valve member having a circumferential groove therein, said sleeve having a plurality of circumferentially spaced longitudinally extending retaining fingers, each of said fingers having an inwardly extending detent which is aligned with said circumferential groove in said valve member when said valve member is in said open position, said latch comprising a water softenable ring received around said retaining fingers to normally maintain said detents in engagement with said circumferential groove and thus maintain said valve member in said open position.

* * * * *